United States Patent
Nam et al.

(10) Patent No.: US 10,986,657 B2
(45) Date of Patent: Apr. 20, 2021

(54) SCHEDULING OFFSET MANAGEMENT FOR WIRELESS COMMUNICATIONS

(71) Applicant: QUALCOMM Incorporated, San Diego, CA (US)

(72) Inventors: Wooseok Nam, San Diego, CA (US); Xiao Feng Wang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/796,158

(22) Filed: Feb. 20, 2020

(65) Prior Publication Data
US 2020/0196340 A1    Jun. 18, 2020

Related U.S. Application Data

(63) Continuation of application No. 16/522,280, filed on Jul. 25, 2019.

(60) Provisional application No. 62/703,692, filed on Jul. 26, 2018.

(51) Int. Cl.
| | |
|---|---|
| *H04L 12/28* | (2006.01) |
| *H04W 72/12* | (2009.01) |
| *H04W 72/04* | (2009.01) |
| *H04J 1/16* | (2006.01) |

(52) U.S. Cl.
CPC ... *H04W 72/1278* (2013.01); *H04W 72/0446* (2013.01)

(58) Field of Classification Search
CPC ............... H04W 72/0446; H04W 72/1278

USPC ............................... 370/252, 329, 386
See application file for complete search history.

(56) References Cited

U.S. PATENT DOCUMENTS

| | | |
|---|---|---|
| 2013/0010745 A1 | 1/2013 | Ko et al. |
| 2013/0064099 A1 | 3/2013 | Kim et al. |
| 2017/0238305 A1 | 8/2017 | Chen et al. |
| 2018/0227156 A1 | 8/2018 | Papasakellariou |
| 2018/0270799 A1 | 9/2018 | Noh et al. |
| 2018/0279327 A1 | 9/2018 | Ying et al. |
| 2018/0368117 A1 | 12/2018 | Ying et al. |
| 2019/0274032 A1* | 9/2019 | Chatterjee ............ H04W 48/12 |
| 2019/0387506 A1* | 12/2019 | Ugurlu ................. H04L 5/0091 |
| 2020/0037348 A1 | 1/2020 | Nam et al. |
| 2020/0092880 A1* | 3/2020 | Choi ..................... H04W 72/12 |

OTHER PUBLICATIONS

International Search Report and Written Opinion—PCT/US2019/043553—ISA/EPO—dated Oct. 9, 2019.

(Continued)

*Primary Examiner* — John Pezzlo
(74) *Attorney, Agent, or Firm* — Patterson + Sheridan, L.L.P.

(57) ABSTRACT

Certain aspects of the present disclosure provide techniques adjusting scheduling offset for wireless communications. For example, certain aspects provide techniques for modifying the time domain resource allocation configuration to prevent any configurations being used to indicate a scheduling offset of at least a first value.

30 Claims, 11 Drawing Sheets

(56) References Cited

OTHER PUBLICATIONS

Qualcomm Incorporated: "UE Power Saving during Active State", 3GPP Draft; R2-1709117 UE Power Saving During Active State, 3rd Generation Partnership-Project (3GPP), Mobile Competence Centre; 650 Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), pp. 1-6, XP051318910, Retrieved from the Internet: URL:http://www.3gpp.org/ftp/Meetings_3GPP_SYNC/RAN2/Docs/ [retrieved on Aug. 20, 2017].

Qualcomm Incorporated: "Remaining Issues on DL/UL Resource Allocation," 3GPP Draft; R1-1807652_Remaining Issues on DL_UL Resource Allocation—REV1, 3rd Generation Partnership Project (3GPP), Mobile Competence Centre; 650, Route Des Lucioles; F-06921 Sophia-Antipolis Cedex, vol. RAN WG1, No. Busan, Korea; May 21, 2018-May 25, 2018, May 24, 2018, XP051463283, 16 pages, Retrieved from the Internet: URL: http://www.3gpp.org/ftp/tsg%5Fran/WG1%5FRL1/.

ZTE: "Discussion on URLLC control", 3GPP Draft; R1-1806138 Discussion on URLLC Control, 3rd Generation Partnership Project (3GPP), Mobile Competence Centre , 650, Route Des Lucioles ; F-06921 Sophia-Antipolis Cedex ; France, vol. RAN WG1, No. Busan, Korea; May 21, 2018-May 25, 2018, May 20, 2018 (May 20, 2018), XP051441348, 4 Pages, Retrieved from the Internet: URL: http://www.3gpp.org/ftp/Meetings%5F3GPP%5FSYNC/RAN1/Docs [retrieved on May 20, 2018] the whole document.

\* cited by examiner

400

| Row index | PDSCH mapping type | $K_0$ | S | L |
|---|---|---|---|---|
| 1 | Type A | 0 | 3 | 11 |
| 2 | Type A | 0 | 3 | 9 |
| 3 | Type A | 0 | 3 | 8 |
| 4 | Type A | 0 | 3 | 6 |
| 5 | Type A | 0 | 3 | 4 |
| 6 | Type B | 0 | 10 | 4 |
| 7 | Type B | 0 | 6 | 4 |
| 8 | Type B | 0 | 5 | 7 |
| 9 | Type B | 0 | 5 | 2 |
| 10 | Type B | 0 | 9 | 2 |
| 11 | Type B | 0 | 12 | 2 |
| 12 | Type A | 0 | 1 | 13 |
| 13 | Type A | 0 | 1 | 6 |
| 14 | Type A | 0 | 2 | 4 |
| 15 | Type B | 0 | 4 | 7 |
| 16 | Type B | 0 | 8 | 4 |

| Row index | PDSCH mapping type | $K_0$ | S | L |
|---|---|---|---|---|
| 1 | Type A | 0 | 3 | 11 |
| 2 | Type A | 0 | 3 | 9 |
| 3 | Type A | 1 | 3 | 8 |
| 4 | Type A | 2 | 3 | 6 |

FIG. 7

SCHEDULING OFFSET MANAGEMENT FOR WIRELESS COMMUNICATIONS

CROSS-REFERENCE TO RELATED APPLICATION(S)

This application is a continuation of U.S. patent application Ser. No. 16/522,280, filed Jul. 25, 2019, which claims benefit of and priority to U.S. Provisional Patent Application Ser. No. 62/703,692, filed Jul. 26, 2018. Each of these applications is herein incorporated by reference in its entirety as if fully set forth below and for all applicable purposes.

BACKGROUND

Field of the Disclosure

Aspects of the present disclosure relate to wireless communications, and more particularly, to techniques for adjusting scheduling offset for wireless communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for scheduling wireless communications by a user equipment (UE). The method includes receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH. The method further includes modifying the time domain resource allocation configuration to prevent any configurations being used to indicate a scheduling offset of at least a first value. The method further includes detecting a first PDCCH in a first slot. The method further includes processing the first PDCCH to determine a first configuration of the time domain resource allocation configuration indicated in the first PDCCH. The method further includes determining time domain resources of a second slot based on the determined first configuration, wherein the second slot is different than the first slot. The method further includes one of transmitting data on a physical uplink shared channel (PUSCH) or receiving data on a physical downlink shared channel (PDSCH) in the determined time domain resources of the second slot.

Certain aspects provide a method for scheduling wireless communications by a base station (BS). The method includes transmitting an indication for modifying a time domain resource allocation configuration of a user equipment (UE) to prevent any configurations being used to indicate a scheduling offset of at least a first value, the time domain resource allocation configuration comprising one or more configurations of time domain resources relative to transmission of physical downlink control channel (PDCCH), each of the one or more configurations indicating a scheduling offset indicative of a number of slots offset from the reception of PDCCH. The method further includes transmitting a first PDCCH in a first slot, the first PDCCH indicating a first configuration of the time domain resource allocation configuration. The method further includes one of receiving data on a physical uplink shared channel (PUSCH) or transmitting data on a physical downlink shared channel (PDSCH) in time domain resources of a second slot, the second slot being based on the first configuration and the first slot.

Certain aspects provide a UE. The UE comprises a memory and a processor coupled to the memory. The processor is configured to receive an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH. The processor is further configured to modify the time domain resource allocation configuration to prevent any configurations being used to indicate a scheduling offset of at least a first value. The processor is further configured to detect a first PDCCH in a first slot. The processor is further configured to process the first PDCCH to determine a first configuration of the time domain resource allocation configuration indicated in the first PDCCH. The processor is further configured to determine time domain resources of a second slot based on the determined first configuration, wherein the second slot is different than the first slo. The processor is further configured to one of transmit data on a physical uplink shared channel (PUSCH) or receive data on a physical downlink shared channel (PDSCH) in the determined time domain resources of the second slot.

Certain aspects provide a non-transitory computer-readable medium comprising instructions that when executed by a user equipment (UE) cause the UE to perform a method for scheduling wireless communications. The method includes receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH. The method further includes modifying the time domain resource allocation configuration to prevent any configurations being used to indicate a scheduling offset of at least a first value. The method further includes detecting a first PDCCH in a first slot. The method further includes processing the first PDCCH to determine a first configuration of the time domain resource allocation configuration indicated in the first PDCCH. The method further includes determining time domain resources of a second slot based on the determined first configuration, wherein the second slot is different than the first slot. The method further includes one of transmitting data on a physical uplink shared channel (PUSCH) or receiving data on a physical downlink shared channel (PDSCH) in the determined time domain resources of the second slot.

Certain aspects provide a UE. The UE includes means for receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH. The UE further includes means for modifying the time domain resource allocation configuration to prevent any configurations being used to indicate a scheduling offset of at least a first value. The UE further includes means for detecting a first PDCCH in a first slot. The UE further includes means for processing the first PDCCH to determine a first configuration of the time domain resource allocation configuration indicated in the first PDCCH. The UE further includes means for determining time domain resources of a second slot based on the determined first configuration, wherein the second slot is different than the first slot. The UE further includes means for one of transmitting data on a physical uplink shared channel (PUSCH) or receiving data on a physical downlink shared channel (PDSCH) in the determined time domain resources of the second slot.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 4 depicts an example time domain resource allocation table for use for a physical downlink shared channel (PDSCH), in accordance with certain aspects.

FIG. 7 depicts an example time domain resource allocation table for use for a physical downlink shared channel (PDSCH), in accordance with certain aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
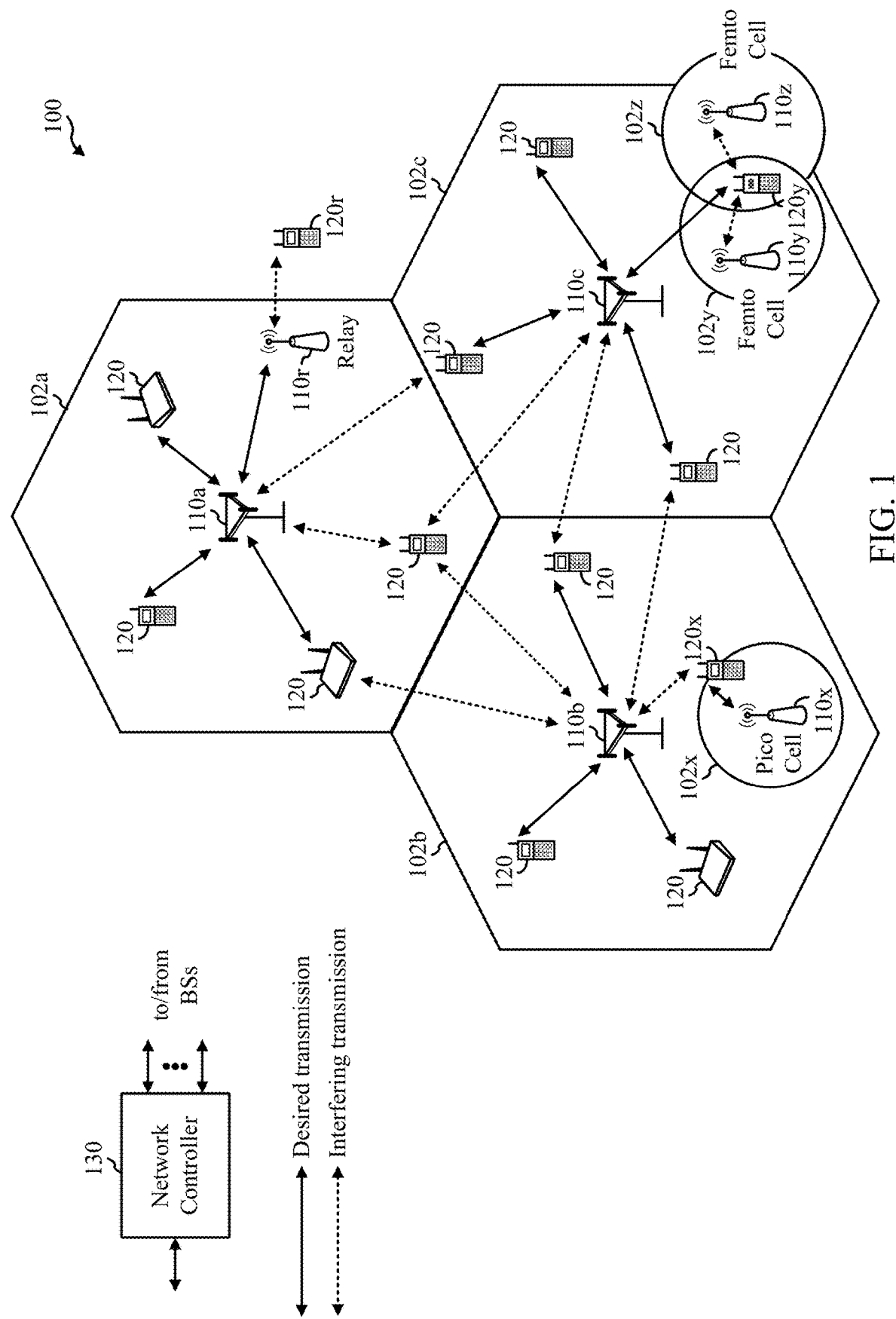
FIG. 1 is a block diagram conceptually illustrating an example telecommunications system, in accordance with certain aspects of the present disclosure.

Aspects of the present disclosure provide apparatus, methods, processing systems, and computer readable mediums for adjusting scheduling offset for wireless communications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed including adjusting scheduling offset for wireless communications. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
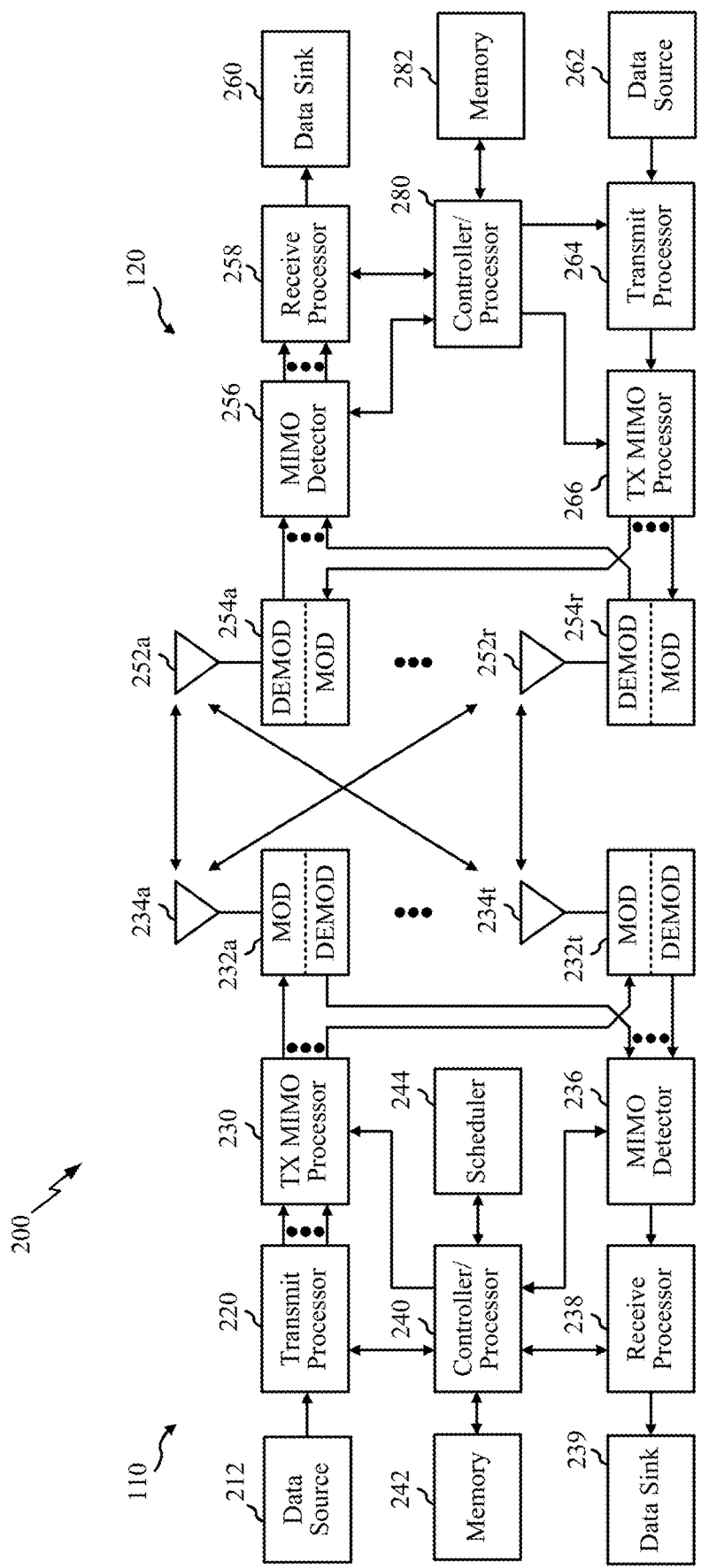
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 260, 238, and/or controller/processor 240 of the BS 110 may be used to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
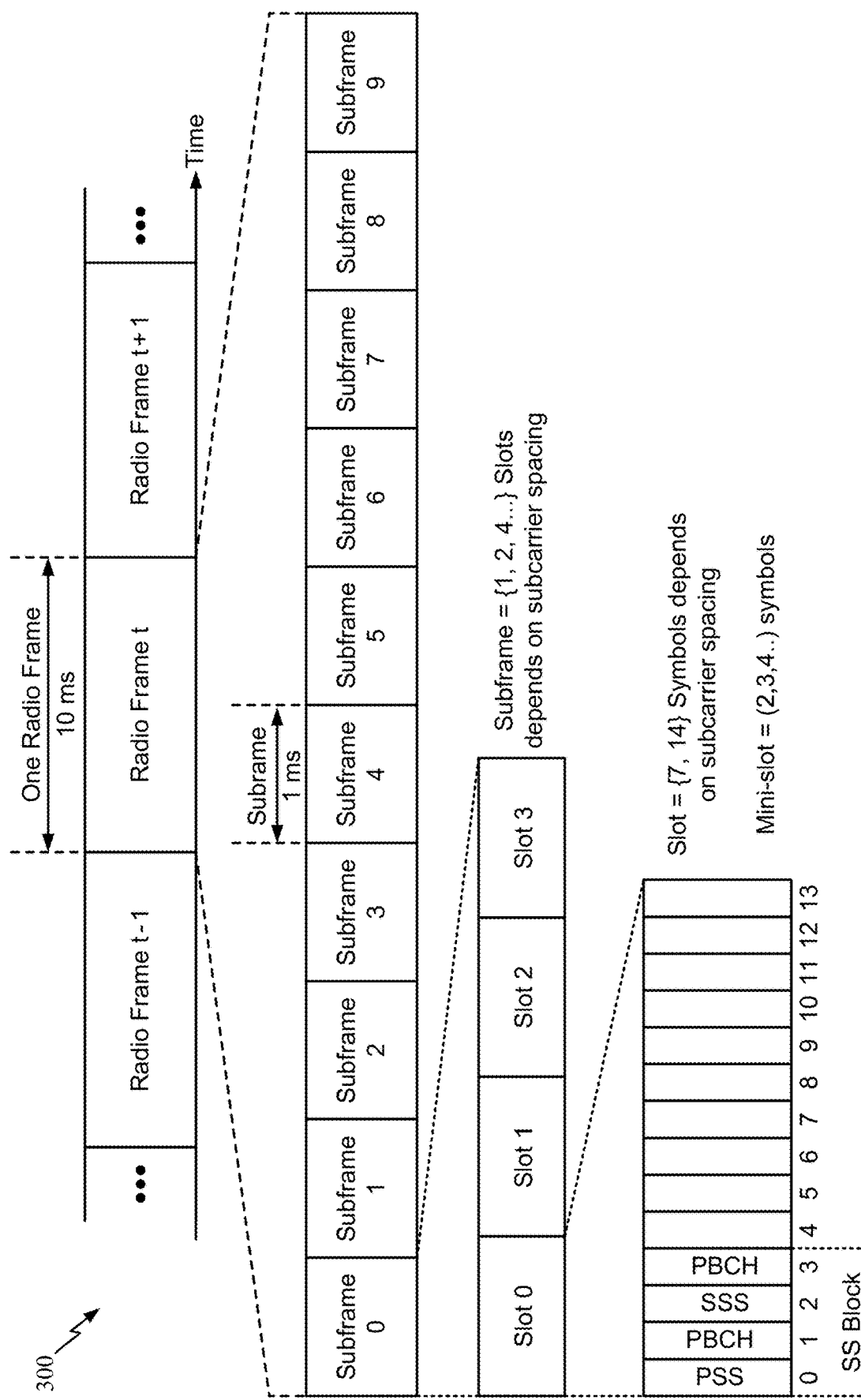
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Adjusting Scheduling Offset for Wireless Communications

Certain communications in a wireless network, such as wireless network 100 of FIG. 1 may be scheduled. For example, a BS (e.g., BS 110 of FIG. 1) may send scheduling information (e.g., DL allocation and/or UL grant in downlink control information (DCI)) indicative of parameters (e.g., time domain resources and/or frequency domain resources) to a UE (e.g., UE 120 of FIG. 1) for communicating (e.g., on the downlink such as in a physical downlink shared channel (PDSCH) and/or on an uplink such as in a physical uplink shared channel (PUSCH)) with the BS. In certain aspects, the BS 110 sends the scheduling information in a physical downlink control channel (PDCCH) to the UE 120. In one example, BS 110 sends DL allocation indicative of parameters for the UE 120 to use to receive data on the PDSCH from the BS 110. In another example, BS 110 sends an UL grant indicative of parameters for the UE 120 to use to transmit data on the PUSCH to the BS 110.

In certain aspects, the UE 120 is configured with one or more time domain resource allocation tables, such as according to 3GPP Specification 38.214 version 15.2.0 (e.g., sections 5.1.2.1 and 6.1.2.1). FIG. 4 depicts an example time domain resource allocation table 400 for use for a PDSCH. It should be noted that UE 120 may be configured with a similar time domain resource allocation table for use for a PUSCH, may be configured with a single time domain resource allocation table for use for both the PDSCH and PUSCH, etc.

As shown, the time domain resource allocation table 400 includes columns corresponding to a row index and scheduling parameters including a mapping type, a scheduling offset (e.g., $k_0$ for PDSCH or $k_2$ for PUSCH), a starting symbol index (S), and a number of symbols (L). Each row of table 400 corresponds to an entry of table 400. In certain aspects, table 400 includes up to 16 rows. Further, each row is indexed by its row index value.

In certain aspects, the scheduling information sent by BS 110 in the PDCCH to UE 120 includes a row index value. The UE 120 is further configured to utilize the row index value to select a row of table 400, and use the scheduling parameters in the selected row to determine time domain resources to utilize for communication with the BS 110, such as on the PDSCH and/or PUSCH corresponding to the PDCCH.

The scheduling offset indicates a number of slots offset from the reception of the PDCCH including the scheduling information by the UE 120. The UE 120 is configured to utilize the scheduling offset to determine a slot to use for communicating (e.g., for receiving the PDSCH or transmitting the PUSCH) with the BS 110 relative to the slot in which the PDCCH is received. For example, if the UE 120 receives the PDCCH in slot n indicating a row index and DL allocation corresponding to a PDSCH for the UE 120, and the scheduling offset associated with the row index is $k_0$, the UE 120 determines that the PDSCH is transmitted by the BS 110 in slot $n+k_0$ and monitors for PDSCH in the slot $n+k_0$. In another example, if the UE 120 receives the PDCCH in slot n indicating a row index and UL grant corresponding to a PUSCH for the UE 120, and the scheduling offset associated with the row index is $k_2$, the UE 120 determines to transmit the PUSCH to the BS 110 in slot $n+k_2$.

The starting symbol index indicates a starting symbol within the slot indicated by the scheduling offset. The UE 120 is configured to utilize the starting symbol to determine a first symbol to use for communicating (e.g., for receiving the PDSCH or transmitting the PUSCH) with the BS 110 in the slot determined based on the scheduling offset. For example, if the starting symbol index associated with the row index from the PDCCH is S, the UE 120 determines that the PDSCH is transmitted by the BS 110 starting at symbol S in slot $n+k_0$ and monitors for PDSCH starting at symbol S in slot $n+k_0$. In another example, if the starting symbol index associated with the row index from the PDCCH is S, the UE 120 determines to transmit the PUSCH starting at symbol S in slot $n+k_2$.

The number of symbols indicates a number of symbols from the symbol indicated by the starting symbol index. The UE 120 is configured to utilize the number of symbols to determine the symbols (including number of symbols) to use for communicating (e.g., for receiving the PDSCH or transmitting the PUSCH) with the BS 110 starting at the first symbol determined based on the starting symbol index. For example, if the number of symbols associated with the row index from the PDCCH is L, the UE 120 determines that the PDSCH is transmitted by the BS 110 on symbols S, S+1, S+(L−1) in slot $n+k_0$ and monitors for PDSCH on symbols S, S+1, S+(L−1) in slot $n+k_0$. In another example, if the number of symbols associated with the row index from the PDCCH is L, the UE 120 determines to transmit the PUSCH on symbols S, S+1, S+(L−1) in slot $n+k_2$.

The mapping type can indicate slot-based scheduling (e.g., Type A) or non-slot-based scheduling (e.g., Type B). For example, in slot-based scheduling, the starting symbol index may be limited to the beginning of the slot (e.g., index values 0-3). For example, in non-slot-based scheduling, the starting symbol index may be in the middle of the slot. In certain aspects, different mapping types may have different demodulation reference signal (DMRS) mappings.

In certain aspects, UE 120 is initially configured (e.g., at manufacture, via an update (e.g., over-the-air (OTA) update), etc.) with one or more default time domain resource allocation tables. For example, table 400 may correspond to a default time domain resource allocation table for PDSCH allocation. In certain aspects, the one or more default time domain resource allocation tables are the same for all UEs 120 in the wireless network 100. Further, in certain aspects, BS 110 configures the UE 120 with one or more UE-specific time domain resource allocation tables (e.g., overwriting a default time domain resource allocation table), such as using RRC signaling. In some cases, such RRC signaling can take 20 ms to 30 ms to complete, which causes delays in configuring the UE 120. Further, to configure the UE 120 with one or more UE-specific time domain resource allocation tables, the BS 110 may send the entirety of the UE-specific time domain resource allocation tables to the UE 120 using RRC signaling, which utilizes bandwidth and communication resources for sending the entirety of the UE-specific time domain resource allocation tables to the UE 120.

Though certain aspects are described with respect to UE 120 being configured with time domain resource allocation tables indicative of different scheduling offsets, it should be noted that UE 120 can be configured in other manners and the various aspects herein can still apply. For example, the UE 120 may have some other type of time domain resource allocation configuration comprising one or more different configurations each indicative of a scheduling offset.

In certain aspects, the PDSCH is transmitted by the BS 110 in the same slot as the PDCCH scheduling the PDSCH. For example, system information (e.g., remaining minimum system information (RMSI)) may need to be scheduled for transmission on the PDSCH in the same slot as the corresponding PDCCH. In such cases, the PDCCH may indicate a scheduling offset of 0 to the UE 120 to indicate that the PDSCH is scheduled in the same slot as the PDCCH.

In certain aspects, communication (e.g., on the PUSCH or PDSCH) is scheduled across slots. In such cases, the PDCCH may indicate a scheduling offset greater than zero to the UE 120 to indicate that the PDSCH/PUSCH is scheduled in a different slot than the PDCCH.

Since the BS 110 can transmit the PDSCH in the same slot as the PDCCH, the UE 120 needs to be able to support receiving the PDSCH in the same slot as it receives the PDCCH, which can use significant resources of the UE 120. The resources used by the UE 120 to support receiving the PDSCH in the same slot as it receives the PDCCH are discussed in relation to the description of FIGS. 5A and 5B.

Figure 5A:
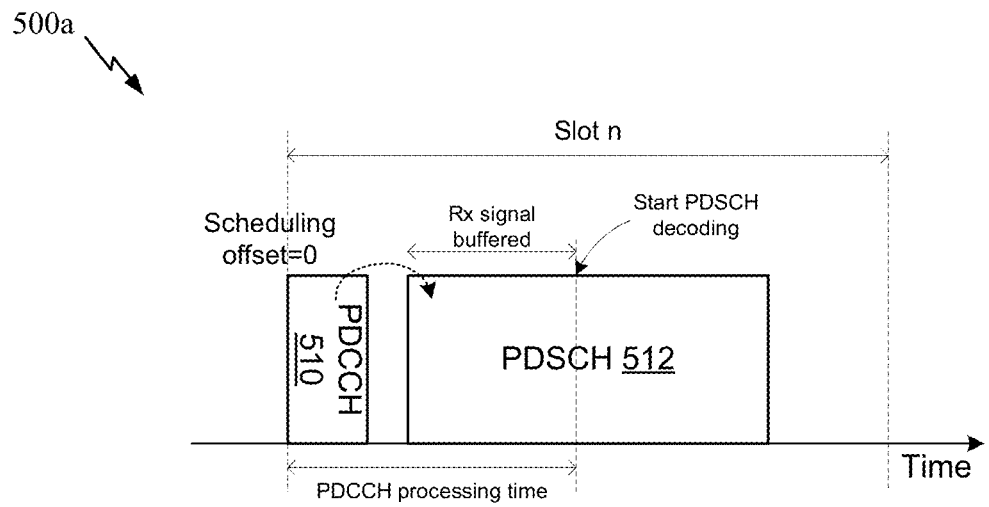
FIG. 5A illustrates wireless communication resources used for communication between at least a BS and a UE, in accordance with certain aspects.

FIG. 5A illustrates wireless communication resources 500a used for communication between at least a BS (e.g., BS 110 of FIG. 1) and a UE (e.g., UE 120 of FIG. 1), in accordance with certain aspects. For example, wireless communication resources 500a include time along a horizontal axis (e.g. X-axis) and frequency along a vertical axis (e.g., Y-axis). In certain aspects, the wireless communication resources 500a shown correspond to a single slot n, as shown.

As shown, the BS 110 transmits a PDCCH 510 at a first time in the slot n prior to transmitting the PDSCH 512 at a second time in the slot n that is later than the first time. The UE 120, in certain aspects, performs blind detection on the PDCCH 510 for control information, including scheduling information as discussed. In the example shown in FIG. 5A, the PDCCH 510 includes a DL allocation and a row index value that maps to a scheduling offset of 0, meaning the PDSCH 512 is in the same slot n as the PDCCH 510. It takes the UE 120 a period of time to process the PDCCH 510 to decode and process control information.

As shown in FIG. 5A, the PDCCH processing time extends beyond the beginning of the PDSCH 512 in slot n. In certain aspects, the UE 120 can only begin decoding and processing the PDSCH 512 after it has processed the PDCCH 510. In particular, without processing the PDCCH 510, the UE 120 does not know when the PDSCH 512 is scheduled (e.g., time domain resources used for the PDSCH 512) or the frequency domain resources used for the PDSCH 512 that are for the specific UE 120. Since the UE 120 does not have information about the resources on which the PDSCH 512 is scheduled prior to processing the PDCCH 510, but the PDSCH 512 could be scheduled prior to processing the PDCCH 510, the UE 120 needs to store (e.g., buffer) all received signals on the downlink that could correspond to the PDSCH 512 from the time after the PDCCH 510 ends (or after a gap period after the PDCCH 510 ends) to the time the PDCCH 510 is fully processed. In particular, the UE 120 needs to buffer such received signals as only after the PDCCH 510 is full processed can the UE 120 determine if the received signals include PDSCH 512 for the UE 120 and process the portion of the received signals including PDSCH 512 for the UE 120. Large memory resources are used to store the entire received signals since resources specific to the UE are unknown until the UE decodes PDCCH 510. This additional use of processing power and storage reduce the capabilities of the UE.

Figure 5B:
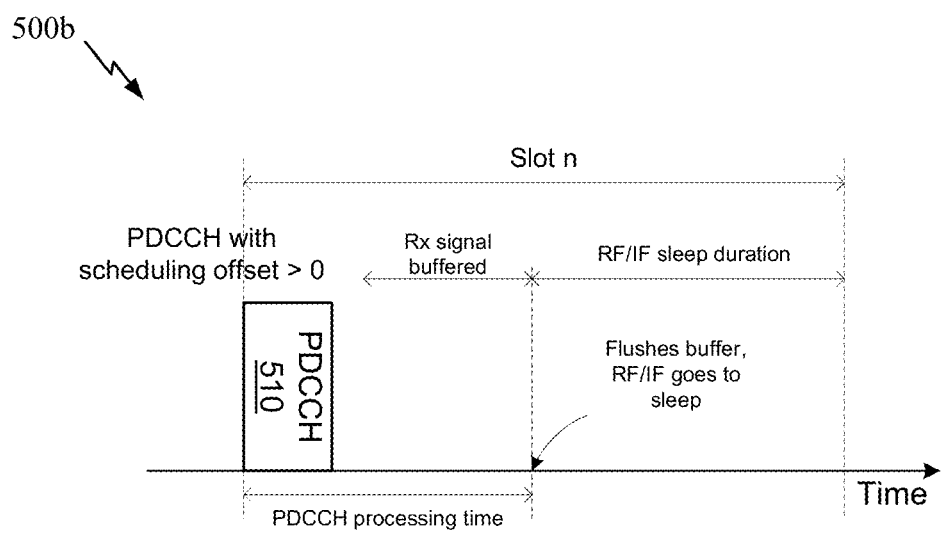
FIG. 5B illustrates wireless communication resources used for communication between at least a BS and a UE, in accordance with certain aspects.

FIG. 5B illustrates wireless communication resources 500b used for communication between at least a BS (e.g., BS 110 of FIG. 1) and a UE (e.g., UE 120 of FIG. 1), in accordance with certain aspects. Wireless communication resources 500b are similar to 500a, except that a PDSCH is not transmitted in the same slot n as the PDCCH 510. In the example shown in FIG. 5B, the PDCCH 510 includes a DCI and a row index value that maps to a scheduling offset greater than 0, meaning the PDSCH is in a different slot than the PDCCH 510.

The UE 120 does not have information about the resources on which the PDSCH is scheduled prior to processing the PDCCH 510, and still has to assume the PDSCH could be scheduled prior to processing the PDCCH 510, so the UE 120 still needs to store (e.g., buffer) all received signals on the downlink that could correspond to the PDSCH from the time after the PDCCH 510 ends (or after a gap period after the PDCCH 510 ends) to the time the PDCCH 510 is fully processed. Only after the PDCCH 510 is fully processed does the UE 120 determine the PDSCH is not in slot n and then it can discard the buffer. Large memory resources are therefore used to buffer the entire received signals that are not actually used. Further, receiver components (e.g., radio frequency/intermediate frequency components, such as transceivers 254) of UE 120 are powered and in an active mode to actually receive the signals on the downlink from the time after the PDCCH 510 ends (or after a gap period after the PDCCH 510 ends) to the time the PDCCH 510 is fully processed, and can only be powered down (e.g., put in sleep mode) after the PDCCH 510 is fully processed and the UE 120 determines it does not have to receive further signals in the slot n. This can cause extra power consumption and use of resources of the receiving components.

Accordingly, certain aspects herein provide techniques for adjusting scheduling offset for wireless communications. In particular, certain aspects provide for dynamically managing scheduling offsets used by a UE 120 to prevent the use of any scheduling offsets with one or more particular values. For example, in certain aspects, the techniques provide for dynamically managing scheduling offsets used by a UE 120 to prevent the use of any scheduling offsets with the value of zero.

Figure 6:
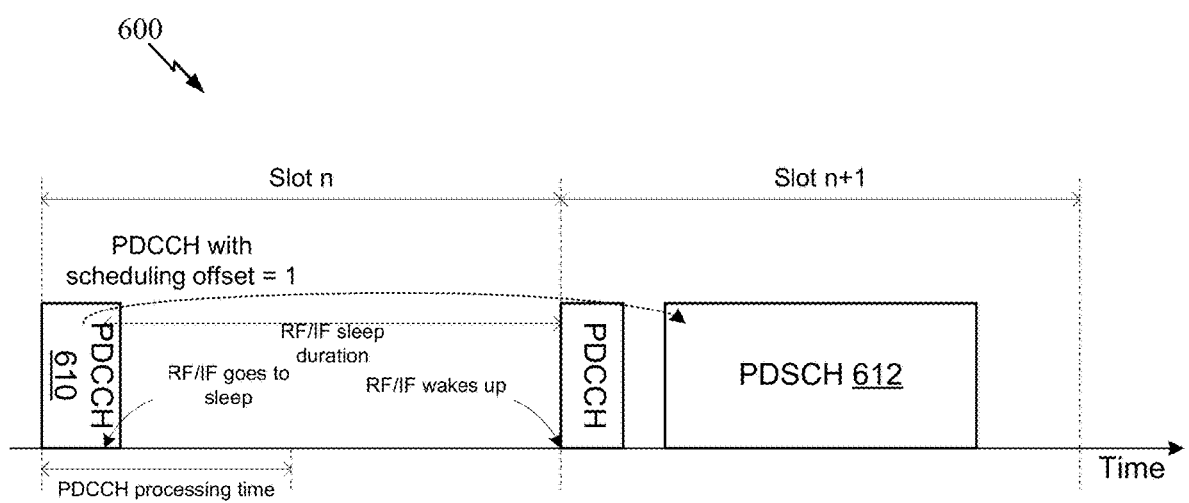
FIG. 6 illustrates wireless communication resources used for communication between at least a BS and a UE, in accordance with certain aspects.

FIG. 6 illustrates wireless communication resources 600 used for communication between at least a BS (e.g., BS 110 of FIG. 1) and a UE (e.g., UE 120 of FIG. 1), in accordance with certain aspects. For example, wireless communication resources 600 include time along a horizontal axis (e.g. X-axis) and frequency along a vertical axis (e.g., Y-axis). In certain aspects, the wireless communication resources 600 shown correspond to a slot n and a slot n+1, as shown.

As shown, the BS 110 transmits a PDCCH 610 at a first time in the slot n prior to transmitting the corresponding PDSCH 612 at a second time in the slot n+1. In the example shown in FIG. 6, the PDCCH 610 includes a DCI and a row index value that maps to a scheduling offset of 1, meaning the PDSCH 612 is 1 slot later than the slot including the PDCCH 610.

In certain aspects, the BS 110 configures the UE 120 to prevent the use of any scheduling offsets with the value of zero. Accordingly, the UE 120 knows that the PDSCH 612 cannot be in the same slot as the PDCCH 610. Therefore, the UE 120 does not need to store any received signals that could correspond to the PDSCH from the time after the PDCCH 610 ends (or after a gap period after the PDCCH 610 ends) to the time the PDCCH 610 is fully processed as there is no possibility of there being a PDSCH during that time. Accordingly, advantageously, memory resources are not used to buffer the entire received signals thereby saving on storage efficiency. Further, in certain aspects, the UE 120 can power down receiving components after the PDCCH 610 ends for the remainder of the slot n, even before the PDCCH 610 is fully processed, as no PDSCH 612 will need to be received in slot n. This advantageously reduces power consumption at the UE 120.

In certain aspects, BS 110 transmits an indication to UE 120 to dynamically change scheduling offset values configured at the UE 120, such as in a time domain resource allocation table, to prevent the use of any scheduling offsets with one or more particular values (e.g., zero). In certain aspects, the indication is transmitted by the BS 110 to the UE 120 via L1 and/or L2 signaling (e.g., in a DCI or media access control—control element (MAC-CE)). Such signaling may have reduced latency as compared to other signaling such as RRC signaling.

The UE 120 receives the indication and modifies its time domain resource allocation configuration (e.g., time domain resource allocation table) to prevent any configurations (e.g., entries) being used to indicate a scheduling offset of at least a first value, such as less than the first value, or of multiple values. In certain aspects, the time domain resource allocation configuration (e.g., time domain resource allocation table) is modified so that no configurations (e.g., entries) include a scheduling offset of the at least a first value. In another aspect, the UE 120 determines based on the indication that any configurations with a scheduling offset of the at least a first value are not used for scheduling by the BS 110.

In certain aspects, the indication comprises an offset value greater than zero (e.g., corresponding to the greatest of the at least the first value). The UE 120 then adds the offset value to each scheduling offset of each configuration of the time domain resource allocation configuration. For example, where the offset value is x, the UE 120 would add x to each scheduling offset of each row of table 400 of FIG. 4.

In certain aspects, the indication comprises the at least the first value. The UE 120 then determines that any configurations with a scheduling offset of the at least a first value are not used for scheduling by the BS 110. For example, where the at least the first value is 0, rows 1 and 2 of table 700 of FIG. 7 (similar to table 400 of FIG. 4) would not be used for scheduling.

In certain aspects, the use of an indication such as an offset value or the at least the first value saves on communication resources as little data is transferred from the BS 110 to the UE 120 as compared to transmitting an entire new time domain resource allocation configuration.

In certain aspects, the indication to dynamically change scheduling offset values transmitted by the BS 110 causes the UE 120 to modify its time domain resource allocation configuration for only a period of time. Accordingly, after the period of time, the UE 120 reverts to using the unmodified time domain resource allocation configuration (e.g., the time domain resource allocation table without the addition of the offset value, use of all configurations, etc.). In certain aspects, the duration of the time period is pre-configured at the UE 120, such as during manufacture, OTA update, etc. In certain aspects, the duration of the time period is configured at the UE 120, such as using RRC signaling. In certain aspects, an indication of the duration of the time period is included in the indication to dynamically change scheduling offset values transmitted by the BS 110. In certain aspects, the duration of the time period is until the BS 110 transmits to the UE 120 another indication that ends the dynamic change.

Figure 8:
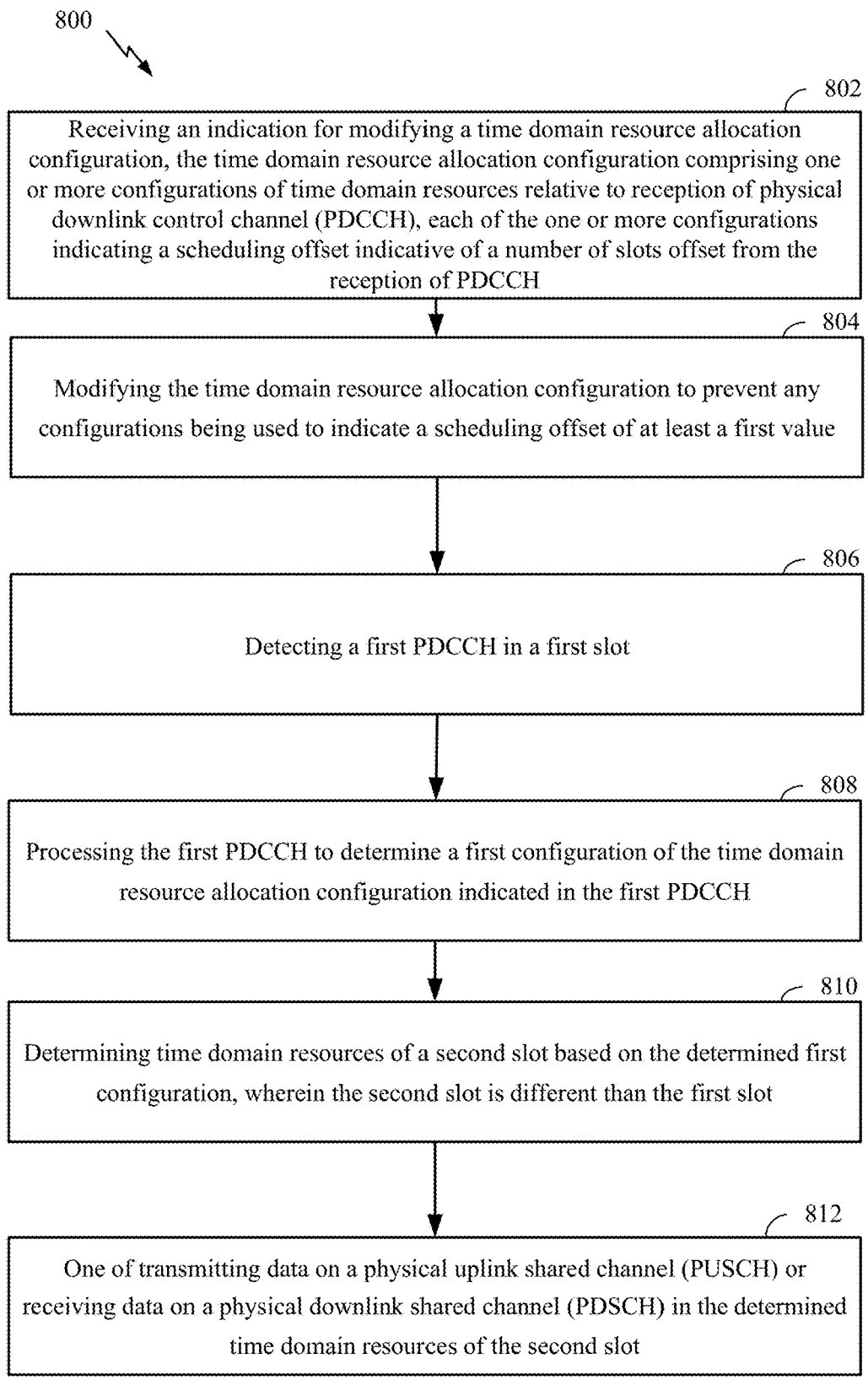
FIG. 8 shows operations of a method of wireless communication performed at a UE in accordance with certain aspects of the disclosure.

FIG. 8 shows operations 800 of a method of wireless communication performed at a UE in accordance with certain aspects of the disclosure. Operations 800 begin at block 802 by a UE receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH. Continuing at block 804, the UE modifies the time domain resource allocation configuration to prevent any configurations being used to indicate a scheduling offset of at least a first value.

At block 806, the UE detects a first PDCCH in a first slot. At block 808, the UE processes the first PDCCH to determine a first configuration of the time domain resource allocation configuration indicated in the first PDCCH. At block 810, the UE determines time domain resources of a second slot based on the determined first configuration, wherein the second slot is different than the first slot. Further, at block 812, the UE one of transmits data on a physical uplink shared channel (PUSCH) or receives data on a physical downlink shared channel (PDSCH) in the determined time domain resources of the second slot.

Figure 9:
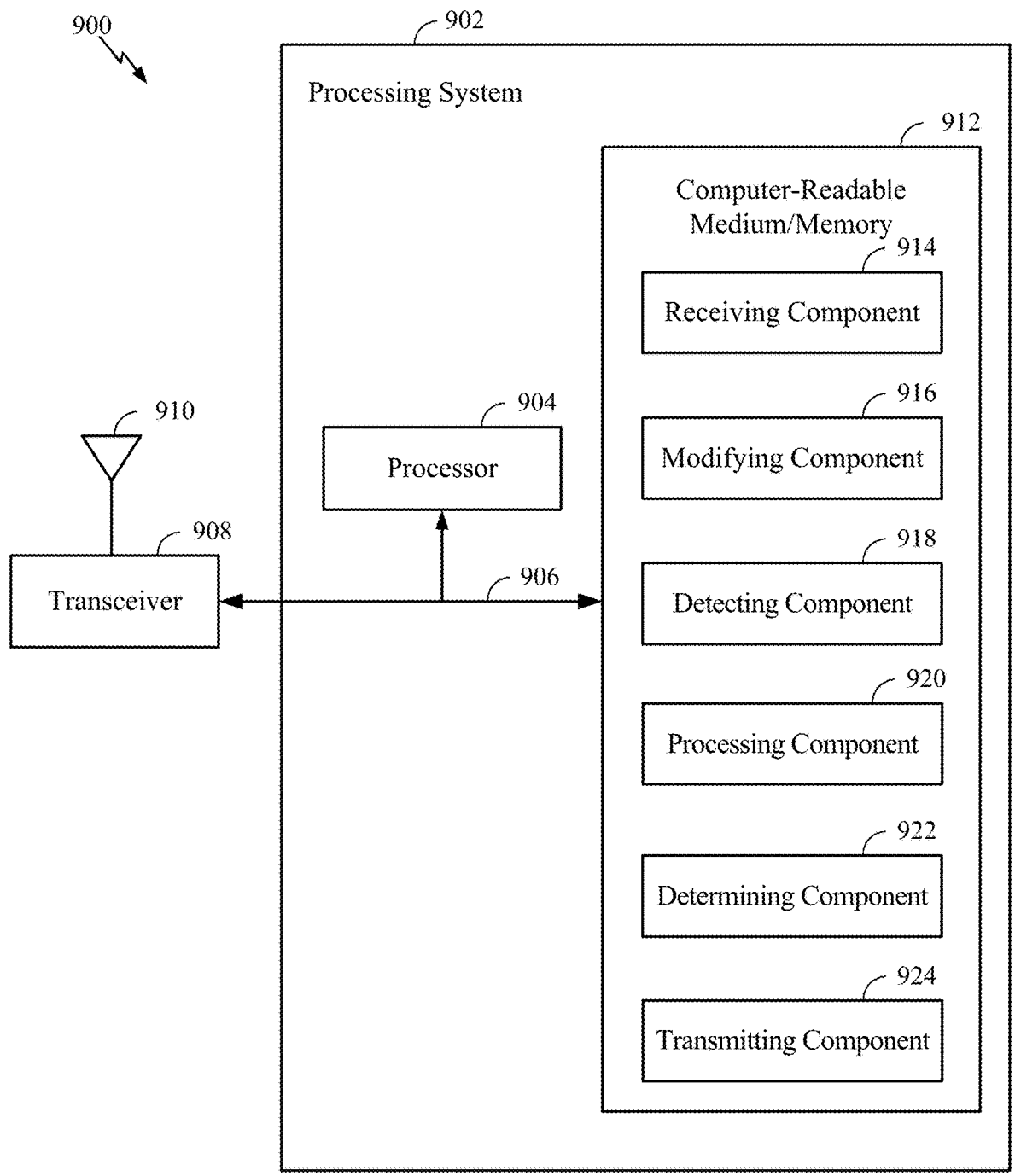
FIG. 9 illustrates a communications device that may include various components configured to perform operations for the techniques disclosed herein, such as the operations illustrated in FIG. 8.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908. The transceiver 908 is configured to transmit and receive signals for the communications device 900 via an antenna 910, such as the various signal described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions that when executed by processor 904, cause the processor 904 to perform the operations illustrated in FIG. 8, or other operations for performing the various techniques discussed herein.

In certain aspects, the processing system 902 further includes a receiving component 914 for performing the operations illustrated in FIG. 8 blocks 802 and 812. Additionally, the processing system 902 includes a modifying component 916 for performing the operations illustrated in FIG. 8 block 804. Additionally, the processing system 902 includes a detecting component 918 for performing the operations illustrated in FIG. 8 block 806. Additionally, the processing system 902 includes a processing component 920 for performing the operations illustrated in FIG. 8 block 808. Additionally, the processing system 902 includes a determining component 922 for performing the operations illustrated in FIG. 8 block 810. Additionally, the processing system 902 includes a transmitting component 924 for performing the operations illustrated in FIG. 8 block 812.

The receiving component 914, modifying component 916, detecting component 918, processing component 920, determining component 922, and transmitting component 924 may be coupled to the processor 904 via bus 906. In certain aspects, the receiving component 914, modifying component 916, detecting component 918, processing component 920, determining component 922, and transmitting component 924 may be hardware circuits. In certain aspects, the receiving component 914, modifying component 916, detecting component 918, processing component 920, determining component 922, and transmitting component 924 may be software components that are executed and run on processor 904.

Figure 10:
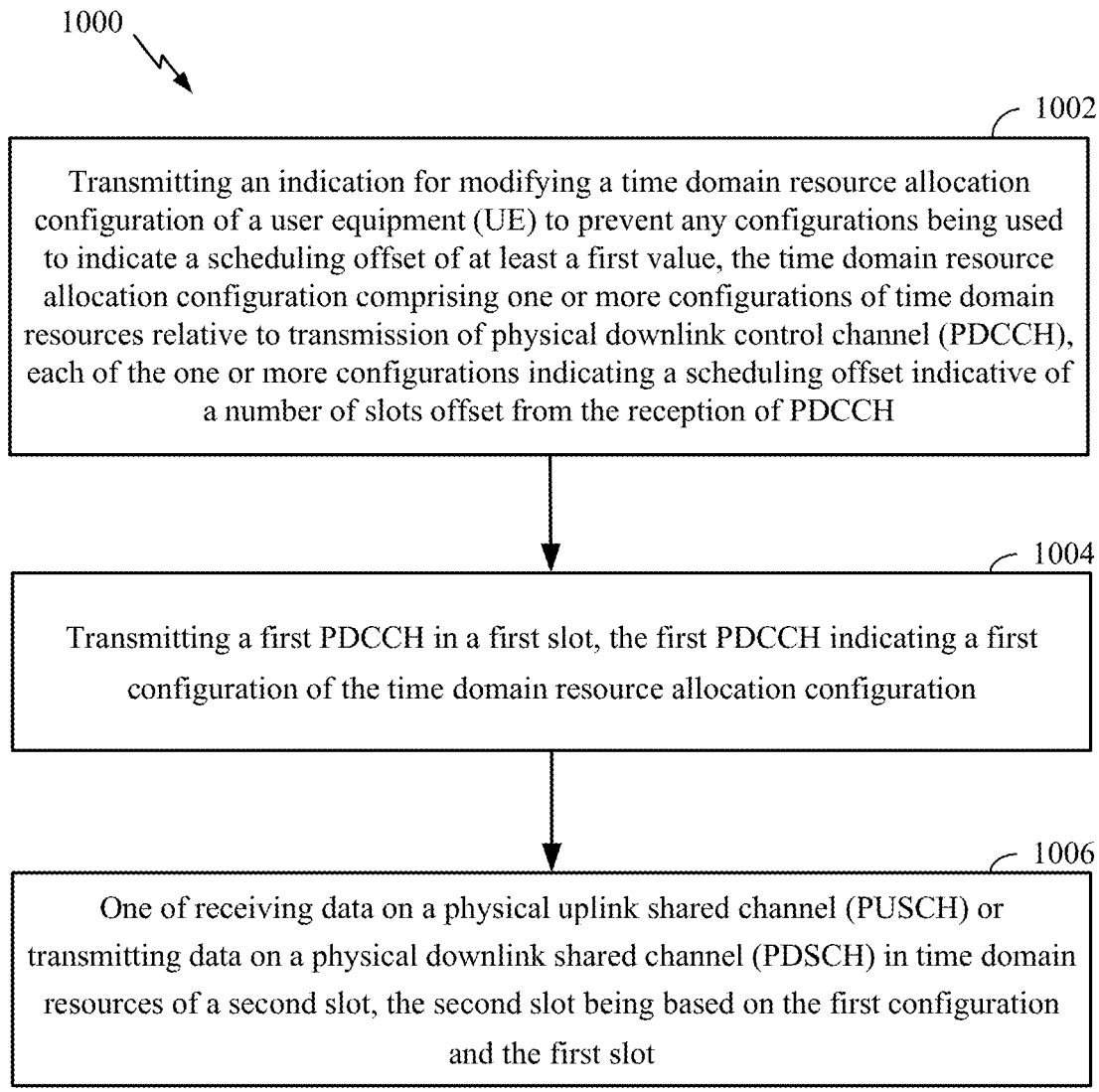
FIG. 10 shows operations of a method of wireless communication performed at a BS in accordance with certain aspects of the disclosure.

FIG. 10 shows operations 1000 of a method of wireless communication performed at a BS in accordance with certain aspects of the disclosure. Operations 1000 begin at block 1002 by a BS transmitting an indication for modifying a time domain resource allocation configuration of a user equipment (UE) to prevent any configurations being used to indicate a scheduling offset of at least a first value, the time domain resource allocation configuration comprising one or more configurations of time domain resources relative to transmission of physical downlink control channel (PDCCH), each of the one or more configurations indicating a scheduling offset indicative of a number of slots offset from the reception of PDCCH. Continuing at block 1004, the BS transmits a first PDCCH in a first slot, the first PDCCH indicating a first configuration of the time domain resource allocation configuration.

At block 1006, the BS one of receives data on a physical uplink shared channel (PUSCH) or transmits data on a physical downlink shared channel (PDSCH) in time domain resources of a second slot, the second slot being based on the first configuration and the first slot.

Figure 11:
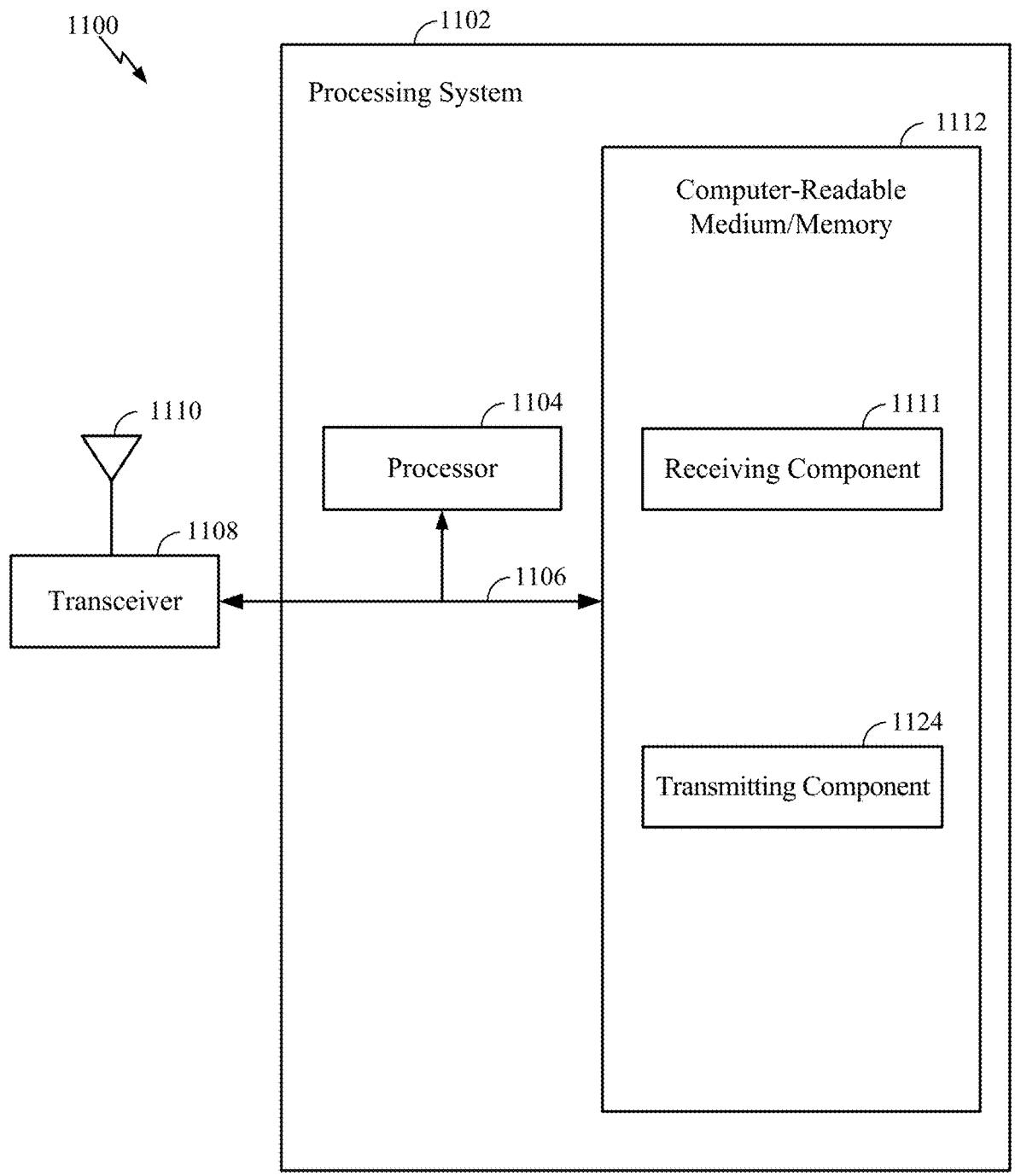
FIG. 11 illustrates a communications device that may include various components configured to perform operations for the techniques disclosed herein, such as the operations illustrated in FIG. 10.

FIG. 11 illustrates a communications device 1100 that may include various components (e.g., corresponding to means-plus-function components) configured to perform operations for the techniques disclosed herein, such as the operations illustrated in FIG. 10. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIG. 10, or other operations for performing the various techniques discussed herein.

In certain aspects, the processing system 1102 further includes a receiving component 1111 for performing the operations illustrated in FIG. 10 blocks 1002-1006. Additionally, the processing system 1102 includes a transmitting component 1124 for performing the operations illustrated in FIG. 10 block 1006.

The receiving component 1111 and transmitting component 1124 may be coupled to the processor 1104 via bus 1106. In certain aspects, the receiving component 1111 and transmitting component 1124 may be hardware circuits. In certain aspects, the receiving component 1111 and transmitting component 1124 may be software components that are executed and run on processor 1104.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and/or 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for scheduling wireless communications by a user equipment (UE), the method comprising:
receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH;
modifying the time domain resource allocation configuration to prevent any configurations being used to indicate a scheduling offset of at least a first value;
detecting a first PDCCH in a first slot;
processing the first PDCCH to determine a first configuration of the time domain resource allocation configuration indicated in the first PDCCH;
determining time domain resources of a second slot based on the determined first configuration; and
one of transmitting data on a physical uplink shared channel (PUSCH) or receiving data on a physical downlink shared channel (PDSCH) in the determined time domain resources of the second slot.

2. The method of claim 1, wherein modifying the time domain resource allocation configuration comprises determining any configurations indicating a scheduling offset of the at least the first value are not used for scheduling.

3. The method of claim 1, wherein the indication is received one or more of in a downlink control information (DCI) and using Layer 1 signaling.

4. The method of claim 1, wherein the UE comprises a plurality of time domain resource allocation configurations including at least one for use for an uplink and at least one for use for a downlink, the plurality of time domain resource allocation configurations comprising the time domain resource allocation configuration.

5. The method of claim 4, further comprising modifying an additional time domain resource allocation configuration of the plurality of time domain resource allocation configurations.

6. The method of claim 5, wherein the additional time domain resource allocation configuration is modified to prevent any configurations being used to indicate a scheduling offset of at least a second value.

7. The method of claim 1, wherein the time domain resource allocation configuration comprises a time domain resource allocation table, and wherein the one or more configurations comprise one or more entries indicative of time domain resources relative to reception of PDCCH.

8. The method of claim 1, wherein the time domain resource allocation configuration is modified only until a second indication is received.

9. A user equipment (UE), comprising:
a memory; and
a processor coupled to the memory; the processor being configured to:
receive an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH;
modify the time domain resource allocation configuration to prevent any configurations being used to indicate a scheduling offset of at least a first value;
detect a first PDCCH in a first slot;
process the first PDCCH to determine a first configuration of the time domain resource allocation configuration indicated in the first PDCCH;
determine time domain resources of a second slot based on the determined first configuration; and
one of transmit data on a physical uplink shared channel (PUSCH) or receive data on a physical downlink shared channel (PDSCH) in the determined time domain resources of the second slot.

10. The UE of claim 9, wherein modifying the time domain resource allocation configuration comprises determining any configurations indicating a scheduling offset of the at least the first value are not used for scheduling.

11. The UE of claim 9, wherein the indication is received one or more of in a downlink control information (DCI) and using Layer 1 signaling.

12. The UE of claim 9, wherein the UE comprises a plurality of time domain resource allocation configurations including at least one for use for an uplink and at least one for use for a downlink, the plurality of time domain resource allocation configurations comprising the time domain resource allocation configuration.

13. The UE of claim 12, wherein the processor is further configured to modify an additional time domain resource allocation configuration of the plurality of time domain resource allocation configurations.

14. The UE of claim 13, wherein the additional time domain resource allocation configuration is modified to prevent any configurations being used to indicate a scheduling offset of at least a second value.

15. The UE of claim 9, wherein the time domain resource allocation configuration comprises a time domain resource allocation table, and wherein the one or more configurations comprise one or more entries indicative of time domain resources relative to reception of PDCCH.

16. The UE of claim 9, wherein the time domain resource allocation configuration is modified only until a second indication is received.

17. A non-transitory computer-readable medium comprising instructions that when executed by a user equipment (UE) cause the UE to perform a method for scheduling wireless communications, the method comprising:
receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH;

modifying the time domain resource allocation configuration to prevent any configurations being used to indicate a scheduling offset of at least a first value;

detecting a first PDCCH in a first slot;

processing the first PDCCH to determine a first configuration of the time domain resource allocation configuration indicated in the first PDCCH;

determining time domain resources of a second slot based on the determined first configuration; and one of transmitting data on a physical uplink shared channel (PUSCH) or receiving data on a physical downlink shared channel (PDSCH) in the determined time domain resources of the second slot.

18. The non-transitory computer-readable medium of claim 17, wherein modifying the time domain resource allocation configuration comprises determining any configurations indicating a scheduling offset of the at least the first value are not used for scheduling.

19. The non-transitory computer-readable medium of claim 17, wherein the indication is received one or more of in a downlink control information (DCI) and using Layer 1 signaling.

20. The non-transitory computer-readable medium of claim 17, wherein the UE comprises a plurality of time domain resource allocation configurations including at least one for use for an uplink and at least one for use for a downlink, the plurality of time domain resource allocation configurations comprising the time domain resource allocation configuration.

21. The non-transitory computer-readable medium of claim 20, wherein the method further comprises modifying an additional time domain resource allocation configuration of the plurality of time domain resource allocation configurations.

22. The non-transitory computer-readable medium of claim 21, wherein the additional time domain resource allocation configuration is modified to prevent any configurations being used to indicate a scheduling offset of at least a second value.

23. The non-transitory computer-readable medium of claim 17, wherein the time domain resource allocation configuration comprises a time domain resource allocation table, and wherein the one or more configurations comprise one or more entries indicative of time domain resources relative to reception of PDCCH.

24. A user equipment (UE) comprising:

means for receiving an indication for modifying a time domain resource allocation configuration, the time domain resource allocation configuration comprising one or more configurations of time domain resources relative to reception of physical downlink control channel (PDCCH), each of the one or more configurations indicating a scheduling offset indicative of a number of slots offset from the reception of PDCCH;

means for modifying the time domain resource allocation configuration to prevent any configurations being used to indicate a scheduling offset of at least a first value;

means for detecting a first PDCCH in a first slot;

means for processing the first PDCCH to determine a first configuration of the time domain resource allocation configuration indicated in the first PDCCH;

means for determining time domain resources of a second slot based on the determined first configuration; and means for one of transmitting data on a physical uplink shared channel (PUSCH) or receiving data on a physical downlink shared channel (PDSCH) in the determined time domain resources of the second slot.

25. The UE of claim 24, wherein means for modifying the time domain resource allocation configuration comprises means for determining any configurations indicating a scheduling offset of the at least the first value are not used for scheduling.

26. The UE of claim 24, wherein the indication is received one or more of in a downlink control information (DCI) and using Layer 1 signaling.

27. The UE of claim 24, wherein the UE comprises a plurality of time domain resource allocation configurations including at least one for use for an uplink and at least one for use for a downlink, the plurality of time domain resource allocation configurations comprising the time domain resource allocation configuration.

28. The UE of claim 27, further comprising means for modifying an additional time domain resource allocation configuration of the plurality of time domain resource allocation configurations.

29. The UE of claim 28, wherein the additional time domain resource allocation configuration is modified to prevent any configurations being used to indicate a scheduling offset of at least a second value.

30. The UE of claim 24, wherein the time domain resource allocation configuration comprises a time domain resource allocation table, and wherein the one or more configurations comprise one or more entries indicative of time domain resources relative to reception of PDCCH.

* * * * *